(12) United States Patent
McFall et al.

(10) Patent No.: US 11,681,825 B2
(45) Date of Patent: Jun. 20, 2023

(54) DIGITAL WATERMARKING WITHOUT SIGNIFICANT INFORMATION LOSS IN ANONYMIZED DATASETS

(71) Applicant: PRIVITAR LIMITED, Cambridge (GB)

(72) Inventors: Jason McFall, London (GB); Paul Mellor, Tonbridge (GB)

(73) Assignee: PRIVITAR LIMITED, Cambridge (GB)

( * ) Notice: Subject to any disclaimer, the term of this patent is extended or adjusted under 35 U.S.C. 154(b) by 433 days.

(21) Appl. No.: 15/780,801

(22) PCT Filed: Dec. 1, 2016

(86) PCT No.: PCT/GB2016/053776
§ 371 (c)(1),
(2) Date: Jun. 1, 2018

(87) PCT Pub. No.: WO2017/093736
PCT Pub. Date: Jun. 8, 2017

(65) Prior Publication Data
US 2020/0250338 A1    Aug. 6, 2020

(30) Foreign Application Priority Data

Dec. 1, 2015   (GB) ..................................... 1521134

(51) Int. Cl.
*G06F 7/04*       (2006.01)
*H04N 7/16*       (2011.01)
(Continued)

(52) U.S. Cl.
CPC .......... *G06F 21/6254* (2013.01); *G06F 21/16* (2013.01); *H04L 9/0643* (2013.01);
(Continued)

(58) Field of Classification Search
CPC ... G06F 21/6254; G06F 21/16; H04L 9/0643; H04L 9/0869; H04L 9/3213; H04L 9/3239
(Continued)

(56) References Cited

U.S. PATENT DOCUMENTS

2003/0231785 A1* 12/2003 Rhoads .............. H04N 1/32309
707/E17.112
2005/0268102 A1* 12/2005 Downey ............. H04L 67/1076
713/176
(Continued)

FOREIGN PATENT DOCUMENTS

| CN | 105512523 A | 4/2016 |
|----|-------------|--------|
| FR | 2904903 A1 | 2/2008 |
| WO | 2015/066523 A2 | 5/2015 |

OTHER PUBLICATIONS

International Search Report, dated Feb. 2, 2017, and Written Opinion issued in International Application No. PCT/GB2016/063779.
(Continued)

*Primary Examiner* — Jeffrey C Pwu
*Assistant Examiner* — Samuel Ambaye
(74) *Attorney, Agent, or Firm* — Saul Ewing LLP (57) ABSTRACT

A computer-implemented process of altering original data in a dataset, in which original data is anonymised and a digital watermark is included in the anonymised data. Anonymising the original data incurs information loss, and the process of including the digital watermark does not add significant further information loss. The original data can be a tabular file, a relational or a non-relational database, or the results of interactive database queries. Anonymising the data is achieved using one or more techniques that perturb the original data, such as tokenisation, generalisation; data blurring, synthetic record insertion, record removal or re-ordering.

28 Claims, 3 Drawing Sheets

(51) Int. Cl.
*G06F 21/62* (2013.01)
*G06F 21/16* (2013.01)
*H04L 9/06* (2006.01)
*H04L 9/08* (2006.01)
*H04L 9/32* (2006.01)

(52) U.S. Cl.
CPC .......... *H04L 9/0869* (2013.01); *H04L 9/3213* (2013.01); *H04L 9/3239* (2013.01); *H04L 2209/42* (2013.01); *H04L 2209/56* (2013.01); *H04L 2209/608* (2013.01)

(58) Field of Classification Search
USPC .......................................................... 726/26
See application file for complete search history.

(56) References Cited

U.S. PATENT DOCUMENTS

| | | | |
|---|---|---|---|
| 2008/0002854 A1* | 1/2008 | Tehranchi | G10L 19/018 382/100 |
| 2010/0034376 A1 | 2/2010 | Okuizumi et al. | |
| 2013/0279741 A1 | 10/2013 | Celik et al. | |
| 2013/0318356 A1* | 11/2013 | Diehl | G06F 21/10 713/176 |
| 2015/0067881 A1* | 3/2015 | Badstieber | G06F 16/13 726/26 |
| 2015/0128284 A1 | 5/2015 | Lafever et al. | |
| 2015/0379303 A1 | 12/2015 | Lafever et al. | |

OTHER PUBLICATIONS

Schrittwieser et al., "An algorithm for k-anonymity-based fingerprinting," Digital Forensics and Watermarking, Springer Berlin Heidelberg, pp. 439-452 (Oct. 23, 2011) XP047011483.

Combined Search and Examination Report, dated May 3, 2017, issued in corresponding GB Application No. GB1620402.6.

Deng et al., "Attacks on two buyer-seller watermarking protocols and an improvement for revocable anonymity," International Synposium on Electronic Commerce and Security (2008).

Vahab, "A new watermarking approach for relational data," University of California, Berkeley (2008).

* cited by examiner

DIGITAL WATERMARKING WITHOUT SIGNIFICANT INFORMATION LOSS IN ANONYMIZED DATASETS

CROSS REFERENCE TO RELATED APPLICATIONS

This application claims the priority of PCT/GB2016/053776, filed on Dec. 1, 2016, which claims priority to GB Application No. GB1521134.5, filed on Dec. 1, 2015, the entire contents of which being fully incorporated herein by reference.

BACKGROUND OF THE INVENTION

1. Field of the Invention

This invention relates to a computer-implemented process of altering original data in a dataset; data anonymisation and digital watermarking is applied.

2. Description of the Prior Art

Many organisations hold highly valuable datasets, which enable a wide number of secondary uses. Health data enable medical research; consumer banking and retail purchase data enable fraud analysis, market analysis and economic modelling; telecoms data enable a vast array of behavioural analyses, and there are countless other examples. However, since such datasets often contain highly private data about individuals, great care must be taken to ensure that this private information is protected.

Two mechanisms to protect individual privacy are to remove or obscure the private data in a dataset through anonymisation techniques, and to control and track the distribution of a data set by inserting a digital watermark into the data.

Anonymisation techniques reduce the risk of an adversary identifying one or more individuals in a dataset. Watermarking enables detection and attribution of unauthorised distribution or publishing of a sensitive dataset, and so enables deterrent mechanisms against such unauthorised behaviour.

Anonymisation of a dataset reduces the risk of re-identification but may not completely eliminate all possibility of doing so, and so it is prudent to also apply digital watermarking. Embedding a unique fingerprint into a dataset enables that dataset to be associated with an audit trail of who authorized data access to which user, and for what purpose. This information may be encoded within the watermark or stored in a registry, with the key to that record encoded within the watermark.

The formats used for many documents, media files or computer programs often contain metadata or redundant data within which a watermark can be encoded without damaging the integrity of the file. By contrast, raw datasets (for example a tabular file, an extract from a relational or semi structured non-relational database, or the result of an interactive database query) typically do not contain such metadata or redundant data, and so digital watermarking typically requires manipulating or perturbing the data itself, leading to an undesirable loss of information and utility of the dataset.

However, privacy preserving techniques such as tokenisation, generalisation, data blurring and insertion of synthetic records do themselves perturb the raw data, in order to remove or generalise the private data. By extending and specialising these anonymisation techniques to incorporate watermark generation, as taught by the invention, digital watermarks may be embedded in an anonymised dataset without further information loss beyond that incurred by anonymisation.

SUMMARY OF THE INVENTION

The invention is a computer-implemented process of altering original data in a dataset, comprising the step of anonymising the original data, and including a digital watermark in the anonymised data.

Optional features of the invention include one or more of the following:

Anonymising the original data incurs information loss, and the further step of including the digital watermark does not add significant further information loss. The digital watermark may operate on a probabilistic basis (we give specific examples below).

The watermark may be included in original raw data that has been anonymised, as opposed to metadata or redundant data. The original data may be a tabular file, a relational or a non-relational database, or the results of interactive database queries.

Anonymising the data is achieved using one or more techniques that perturb the original data, such as tokenisation, generalisation; data blurring, synthetic record insertion, record removal or re-ordering.

When tokenization is used, watermarking is incorporated by extending this tokenisation to generate or select replacement values according to a key or containing a hidden pattern; a function of other fields in the same record; or to use some unique token values in each data release which only ever appear in that release and so uniquely identify it.

When generalization is used, watermarking is incorporated through the choice of how to generate the replacement for a raw value; or the distribution of the populations of the unique groups; or the choices of group boundaries; or selecting group members to create patterns of data in other variables in the dataset for those individuals within a group.

When data blurring is used, watermarking is incorporated by perturbing the data in such a way as to include a pattern within the perturbed values, or to generate the offset values according to an algorithm or secret key.

When insertion of synthetic records is used, watermarking is incorporated by generating the data in these synthetic records according to a pattern or digital key.

When removal of records is used, watermarking is incorporated by the choice and recording of which records to include and suppress.

The watermark to be encoded into the anonymised data may be a number or other ID (collectively a 'number') which is stored in a watermark registry or is a number that is related or mapped to another number which is stored in the watermark registry. The number stored in the watermark registry may be: a random number; an e-mail address; a unique ID associated with a person; a unique text string; or any data string mapped or related to the foregoing. The watermark to be encoded into the anonymised data may be a random decimal number, which is stored in a watermark registry. The length of the number may be determined by the number and size of the file's available watermark carrier.

Each watermark carrier may use its assigned digits as the probability of performing some mutation to each value it processes. Reprocessing of the resultant output file and observing how often the mutation occurs allows deduction of the probability with which it was applied, and hence enables reconstruction of the watermark.

An audit trail of who authorized data access to which user, and for what purpose is encoded within the watermark and/or stored in the registry, with the key to that record encoded within the watermark.

For each watermarked data release, the registry may also store details including one or more of: the source data location, schema and description, the policy and techniques applied to create the anonymised copy, the level of sensitivity of the source and anonymised data, the name and contact details user or group of users approved to use the anonymised data, the name and contact details of the approver, and the purpose and duration for which the data is to be used.

The watermark may be encoded into each row of a file, so that the removal or modification or addition of individual rows in the output has negligible effect on the ability to reconstruct the watermark.

Mutations may be applied to each cell or row individually, without any knowledge of what mutations will be applied to other rows, to allow the watermark to be applied to the data in a distributed, streaming fashion.

The watermark may be encoded by altering the frequency distribution of bits or digits in the anonymised data (we give specific examples below).

Components of the watermark may be encoded at the row level. Where the watermark requires row removal, then the watermark digits define a band of the hash number space and if the watermark component is an N digit decimal number D with a first digit that is >0, then this range is given by $[H_L+((H_u-H_L)*(D-1)*10-N), H_L+((H_u-H_L)*D*10-N))$, where $H_L$ and $H_u$ are the lower and upper bounds of the hash number space.

The digits can then be reconstructed from the output file by hashing each row and building up a histogram of hash frequency, where each bin has width $10^{-N}$ of the hash number space so that the bin that contains no values reveals the digits for this watermark carrier.

Where the watermark requires row addition, then N watermark digits define a slice of the hash space and synthetic data is then generated that hashes to a number within this range. The digits can be reconstructed from the output file by hashing each row and building up a histogram of hash frequency so that a bin that is overrepresented in this histogram reveals the digits for this watermark carrier.

The watermark carriers may be at the cell level and depend on whether the cell data type is for numeric values or tokenised values. Where the cell data type is for numeric values, N*M digits of the watermark are used to mutate the N least significant bits of each value, with a precision of M, and for each of the N watermark digits, the digit is divided by $10^M$ to derive the probability that this bit will be set in one of the values, and values in the cell are then mutated, setting this bit with the required probability. When reading the file back, the process is to stream through the values and derive the probability of zero for each of the N carrier bits, to a precision of M, to reveal the N*M original digits. N is chosen depending on the range of the numeric values to constrain value distortion to an acceptable range, and M should be chosen based on the data volume.

Where the cell data type is for tokenised values, tokenised cell values are generated consistent with some regular expression and analysis of this regular expression gives a lexicographically ordered list of all possible output tokens. The watermark component may be an N digit decimal number D with a first digit that is >0, which is used to exclude any output tokens that have an ordinal that is divisible by D, and to reconstruct the watermark digits, the process is to create a histogram with a bin for each number from $10^{N-1}$ to $10^N-1$ and for each token the process is to increment the bin count for all of the token ordinal's factors, so that the lowest ordinal bin with a zero count or small count reveals the watermark digits. N is set with regard to the number of unique input values that require tokenisation, so that a greater volume of data requires a larger value of N.

There is no requirement to exactly reconstitute the watermark but merely to be able to perform a fuzzy match of a calculated value to the distinct possibilities recorded in a watermark registry that stores watermarks. Using the digital watermark enables detection and attribution of unauthorized distribution or publishing of data.

The processes described above may also include including non-destructive watermarking techniques, such as reordering records or data fields within the dataset.

The processes described above are implemented using one or more computer processors.

At least some of original data defines private medical or health data; private banking or financial data; private communications data; human resources or payroll data; retail or e-commerce data; government records, including records relating to one or more of: taxation; health insurance; mortgages; pensions; benefits; education; health.

Another aspect of the invention is a computing device or computing system programmed to implement the process defined above.

DETAILED DESCRIPTION

The Watermarking Process

Watermarking must be robust against an adversary removing the watermark by removing or perturbing some of the data in the dataset, or by adding further data. A robust watermarking process uses a combination of techniques to distribute the watermark redundantly throughout the dataset, in order to make it difficult for an adversary to remove the watermark by only releasing a subset of the data and/or by perturbing the data. The dataset must be heavily distorted to destroy the watermark, which further reduces the risk of re-identification of individuals within that dataset, as well as reducing the information content of the data, rendering it less useful to an adversary.

Watermarking techniques that operate on a probabilistic basis meet these criteria. The watermark to be encoded into the data is a random decimal number, which is stored in the watermark registry alongside some meaningful (and private) mnemonic for the watermark.

For each watermarked data release, the registry may also store details such as the source data location, schema and description, the policy and techniques applied to create the anonymised copy, the level of sensitivity of the source and anonymised data, the name and contact details of the user or group of users approved to use the anonymised data, the name and contact details of the approver, and the purpose and duration for which the data is to be used.

The length of the watermark number is determined by the number and size of the file's available watermark carriers (see following section). Each carrier uses its assigned digits as the probability of performing some mutation to each value it processes. Reprocessing of the resultant output file and observing how often the mutation occurs thus allows us to deduce the probability with which it was applied, and hence enables reconstruction of the watermark. Because the watermark is encoded into each row of the file, the removal/modification/addition of individual rows in the output has negligible effect on our ability to reconstruct the watermark. Substantial portions of the file must be removed or modified before error is introduced into the calculation of a carrier. Since errors in these values are often small deviations from the actual value, and because we are not required to exactly reconstitute the original watermark but merely to be able to perform a fuzzy match of our calculated value to the distinct possibilities recorded in the watermark registry, it is very difficult to render the watermark unmatchable without destroying the utility of the file.

Another advantage of this methodology is that the mutations may be applied to each cell or row individually, without any knowledge of what mutations will be applied to other rows. This allows the watermark to be applied to the data in a distributed, streaming fashion.

Watermark Carriers

Components of the watermark may be encoded within carriers at either the row level or the individual cell value level. Where a cell value is mutated by both a row scoped and cell scoped carrier, care must be taken to ensure that the mutated value is consistent with both carriers.

Row Scoped Carriers

A good hash algorithm will give uniformly distributed hashes even on similar inputs, so hashing each row (treating the entire row as a single string by concatenating all values) should give values with a uniform distribution across the hash space. We exploit this fact with the following two techniques:

Row Removal
- The watermark digits define a band of the hash number space—if the watermark component is an N digit decimal number D with a first digit that is >0, then this range is given by $[H*(D-1)*10^{-N}, H*D*10^{-N})$, where H is the hash number space. Any rows that hash to a value within this band are omitted from the output.
- The digits can be reconstructed from the output file by hashing each row and building up a histogram of hash frequency, where each bin has width $10^{-N}$ of the hash number space. The bin that contains no values reveals the digits for this watermark carrier.
- As the data volume grows, the number of carrier digits N may be increased. This allows the volume of discarded data to be reduced whilst also providing greater watermark distinguishability.

Row Addition
- As with row removal, N watermark digits define a slice of the hash space (if using both row removal and row addition, the ranges used must obviously be distinct). Synthetic data is then generated that hashes to a number within this range.
- The digits can be reconstructed from the output file by again hashing each row and building up a histogram of hash frequency. The bin that is overrepresented in this histogram reveals the digits for this watermark carrier.
- Care must be taken when generating the synthetic data to ensure that the column values are consistent with the distribution of values in the genuine rows, and that co-variances between column values are respected.

Cell Scoped Carriers

The carriers available at the cell level depend on the cell data type:

Numeric Values
- N*M digits of the watermark are used to mutate the N least significant bits of each value, with a precision of M. For each of the N watermark digits, the digit is divided by $10^M$ to derive the probability that this bit will be set (i.e. 1) in one of the values. Values in the cell are then mutated, setting this bit to 1 with the required probability.
- When reading the file back, we stream through the values and derive the probability of 1 for each of the N carrier bits, to a precision of M. This reveals the N*M original digits.
- N should be chosen depending on the range of the numeric values to constrain value distortion to an acceptable range, and M should be chosen based on the data volume (with higher volumes we are able to use more digits and still be confident of accurately reconstructing the probability).

Tokenised Values
- Tokenised cell values are generated consistent with some regular expression. Analysis of this regular expression gives a lexicographically ordered list of all possible output tokens. The watermark component is an N digit decimal number D with a first digit that is >0, which is used to exclude any output tokens that have an ordinal that is divisible by D.
- To reconstruct the watermark digits, we create a histogram with a bin for each number from $10^{N-1}$ to $10^N-1$. For each token we increment the bin count for all of the token ordinal's factors. The first bin with a zero count (or small count, to be robust against maliciously added rows) reveals the watermark digits (there may be multiple empty bins if multiples of the chosen factor are present within the bin space—for example, if we remove all tokens where the ordinal is divisible by 20 then we also remove all tokens where the ordinal is divisible by 40, 60, or 80).
- N should be set with regard to the number of unique input values that require tokenisation—a greater volume of data requires a larger value of N (more tokens are required so fewer may be discarded) but this also provides greater watermark distinguishability.

Non Probabilistic Techniques

The probabilistic methods may also be combined with non-destructive watermarking techniques such as reordering records or data fields within a dataset.

Some other approaches:

Order rows in a particular order, either sorted in some order of column precedence, or ordered in some random-looking order Order columns Remove a number of particular rows Add a number of particular synthetic rows to the data Remove or set to zero or null particular fields in the data Add a few specific unusual values or reserved tokens to the data Modify numbers so some digits appear more or less frequently than average Tokenise/obscure some fields by encrypting them with a particular encryption key—by trying which key decrypts the fields in the dataset, that file can be tied to a particular release Introduce some hidden or unprintable characters to some strings Record a hashcode/checksum of the file Record a hashcode/checksum of specific rows of the file Worked Example Input File Consider the first few rows of a simple HR data table that is to be anonymised:

| Name | Age | Salary |
|---|---|---|
| Jeanett Both | 52 | 38625 |
| Alfonzo Laning | 43 | 47587 |
| Sherman Maxfield | 47 | 52822 |
| Giovanna Lampert | 29 | 30330 |
| Merle Stallard | 50 | 42505 |
| Mi Carbonneau | 24 | 29000 |
| Anne Bunch | 38 | 55785 |
| Angelyn Plumadore | 32 | 45512 |
| Arla Hardcastle | 29 | 37099 |
| ... | | |

The user wishes to tokenise the name with the regular expression EMPLOYEE-[0-9]{6} and perturb/blur the age and salary values.

Watermark

Assume that the row count is sufficient to dedicate 2 watermark digits each to the tokenisation process, row removal and row addition techniques.

The numbers in the age column are small, requiring only 6 bits to express the entire range. Therefore we dedicate only a single digit to this column. However the salary values are much larger, requiring 16 or more bits. So we choose to dedicate 5 bits to this column. For this example, we assume a precision of a single digit for both of these columns.

Figure 1:
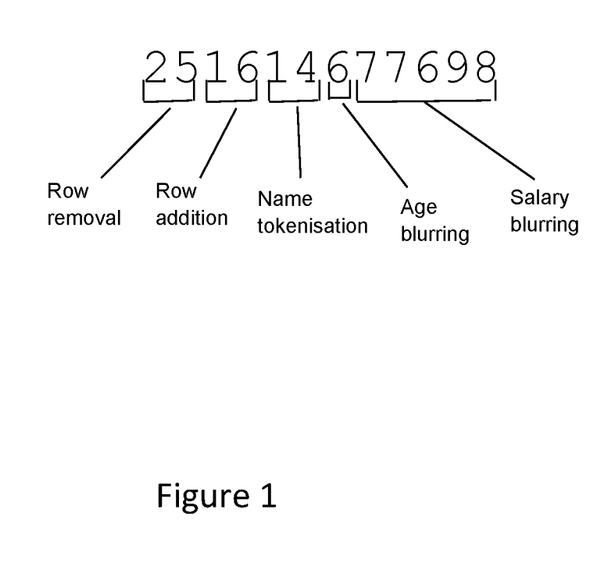
FIG. 1 shows, where a random watermark is generated, its digits being allocated to various watermark carriers

This gives us a total watermark length of 12 digits. A random watermark with this length is then generated, and its digits allocated to the various watermark carriers, as shown in FIG. 1.

Watermarking Process

The cell-level watermarked anonymisation must be processed first, since they change the data that will feed into the row-level techniques.

Name Tokenisation

Lexicographically ordering all of the possible tokens gives a list as so:

EMPLOYEE-000000
EMPLOYEE-000001
EMPLOYEE-000002
...
EMPLOYEE-999999

The watermark digits for this carrier are 1 and 4, so we exclude any tokens where the ordinal of the token within our ordered list is divisible by 14. For example, the tokens EMPLOYEE-000013 and EMPLOYEE-000027 will not be used as their ordinals are 14th and 28th respectively.

Age Blurring

This watermark carrier has a single digit, 6. We use this to ensure that the probability of the least significant bit being set in the blurred value is 0.6. Assuming that the blurring process that the watermark is applied on top of adds noise of up to ±5% to the value, example output for this process might be:

| Input | Output | Binary |
|---|---|---|
| 52 | 52 | 110100 |
| 43 | 42 | 101010 |
| 47 | 47 | 101111 |
| 29 | 29 | 11101 |
| 50 | 51 | 110011 |
| 24 | 25 | 11001 |
| 38 | 38 | 100110 |
| 32 | 33 | 100001 |
| 29 | 28 | 11100 |

Salary Blurring

This watermark carrier has five digits, 77698. Since we are using a precision of 1, each of these digits is divided by 10 to give the probability of being set for the five least significant bits. Again, assuming a ±5% noise from the underlying blur operation, example output might be:

| Input | Output | Binary |
|---|---|---|
| 38625 | 38651 | 1001011011111011 |
| 47587 | 47615 | 1011100111111111 |
| 52822 | 52831 | 1100111001011111 |
| 30330 | 30332 | 111011001111100 |
| 42505 | 42519 | 1010011000010111 |
| 29000 | 29003 | 111000101001011 |
| 55785 | 55801 | 1101100111111001 |
| 45512 | 45535 | 1011000111011111 |
| 37009 | 37119 | 1001000011111111 |

Row Removal

The watermark digits for this technique are 25, so we remove all rows where the hash obtained by hashing the entire row lies between 0.24 and 0.25 of the hash number space. For example, using the 128-bit murmur3 hash algorithm, the possible hash values lie in the range −9223372036854775808→9223372036854775807, so with our watermark digits we would omit any rows that hash to a value lying in the range −4796153459164483420→−4611686018427387904.

Row Addition

The watermark digits for this technique are 16, so we generate synthetic rows which hash to values within the range 0.15→0.16 of the hash number space (i.e. lying in the range −6456360425798343065→−6271892985061247549).

Reading The Watermark

To read the encoded watermark, we stream through the resultant file and for each row update some state in each of the carriers that will allow us to ask the carrier for its estimate of its watermark digits. The accuracy of these estimates improves with each added row, and soon becomes high enough for us to confidently choose the correct watermark from the registry.

Name Tokenisation

Figure 2:
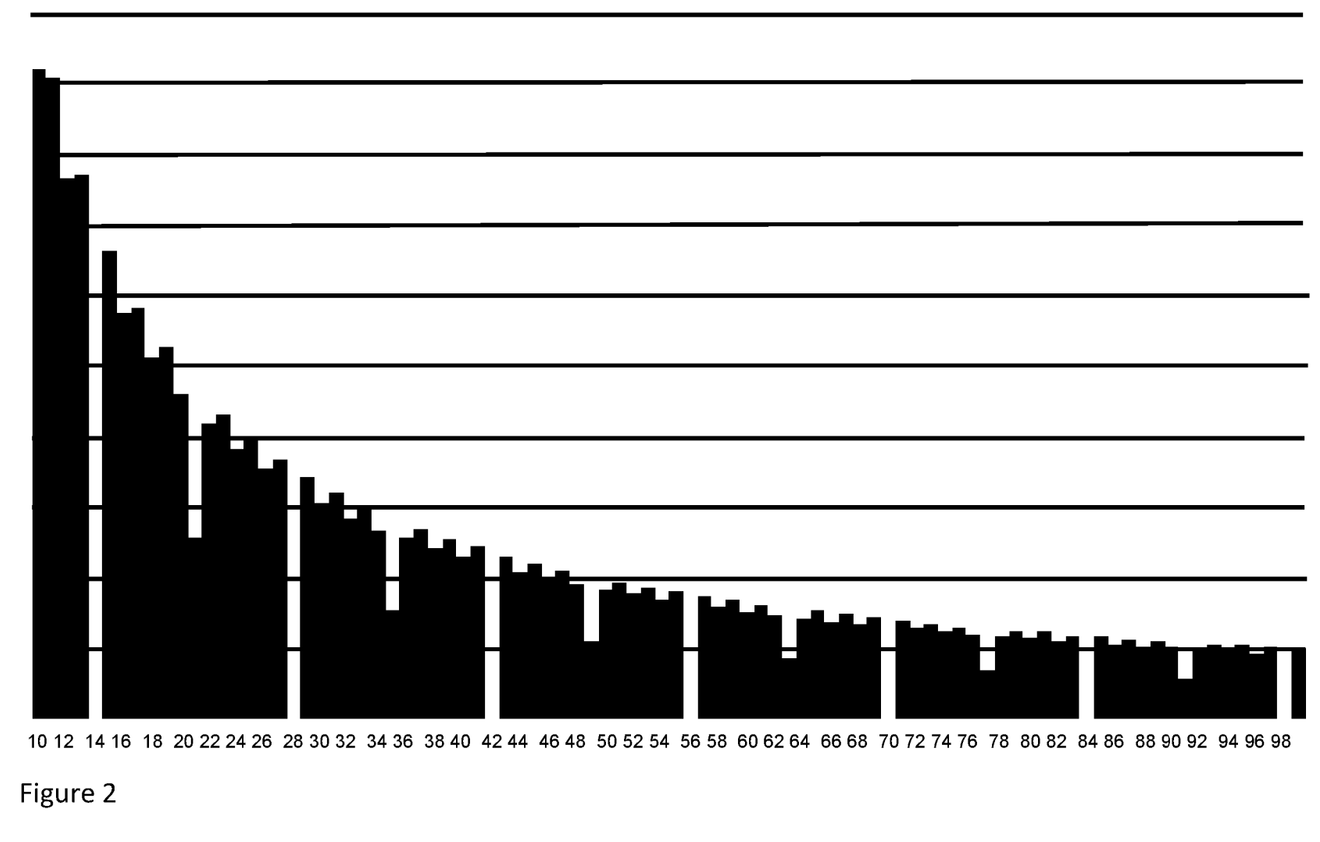
FIG. 2 shows a histogram output for watermark digits '14'.

For each of the two digit possibilities (10-99, since we prohibit a leading zero) we test to see whether the current row's token ordinal is divisible by that number. With each row, we build up a histogram by incrementing the count for each factor of the token ordinal. After processing all of the token rows, we can deduce the watermark digits by finding the smallest bin with a zero count. Using our watermark digits of 14, an example output from this process might be as shown in FIG. 2, where the histogram falls to zero for 14, 28, 42, 56 etc.

Age/Salary Blurring

For each bit that has been perturbed, we count the number of rows where that bit was set (1) and divide by the row count to give us the probability that was used. We then round this to the specified precision to obtain the watermark digits.

Row Removal/Addition

Figure 3:
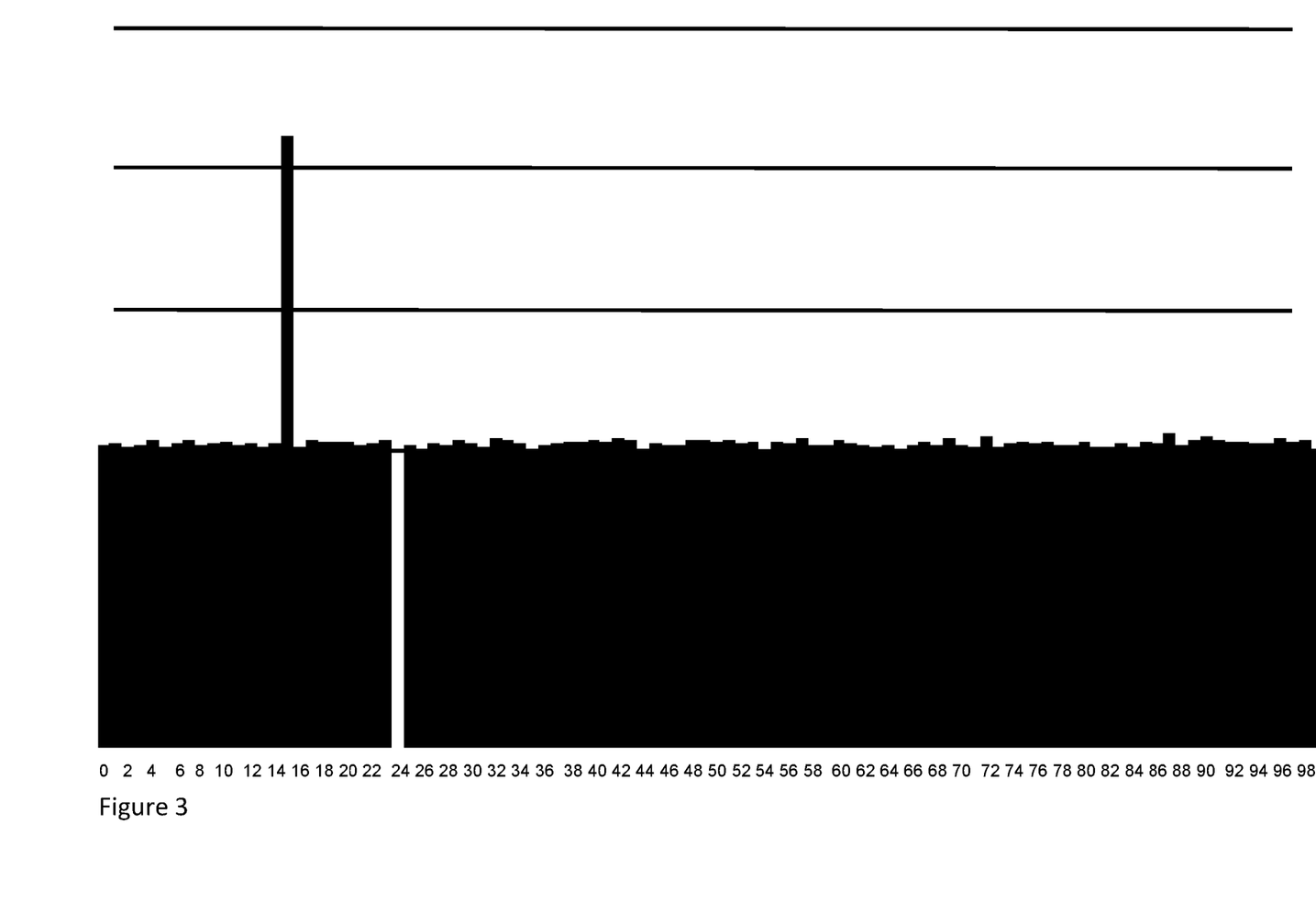
FIG. 3 shows a histogram output giving us watermark carrier digits of 16 for row addition and 25 for row removal.

We divide the hash number space into bins of width determined by the number of digits used in the watermark carrier—in our example this was 2, giving us bins of 1% width. We then build a histogram by hashing each row and incrementing the count in the bin within which the hash falls. Example output for our scenario is shown in FIG. 3, where it can clearly be seen that the bin from 15-16% is overrepresented and the bin from 24-25% contains no data, giving us watermark carrier digits of 16 for row addition and 25 for row removal.

The invention claimed is:

1. A computer-implemented process of altering original data in a dataset, comprising the steps of:
   (a) anonymising the original data, in which anonymizing the original data is achieved using a non-hashing algorithm, and in which the original raw data comprises text strings;
   (b) including a digital watermark in the anonymised data to generate a watermarked data release, the digital watermark being taken from a source that is extrinsic to the dataset, and in which the digital watermark comprises a text string and is embedded in the anonymized data text strings and not in any metadata or redundant data; and
   (c) providing the watermarked data release;
   and in which the digital watermark associates the watermarked data release with an audit trail of which user or users are authorised to use that watermarked data release;
   in which watermark carriers are at the cell level and depend on whether the cell data type is for numeric values or tokenised values;
   in which, where the cell data type is for numeric values, N*M digits of the watermark are used to mutate the N least significant bits of each value, with a precision of M, and for each of the N watermark digits, the digit is divided by $10^M$ to derive the probability that this bit will be set in one of the values, and values in the cell are then mutated, setting this bit with the required probability; and when reading the file back, the process is to stream through the values and derive the probability of zero for each of the N carrier bits, to a precision of M, to reveal the N*M original digits;
   and in which, where the cell data type is for tokenised values, tokenised cell values are generated consistent with some regular expression and analysis of this regular expression gives a lexicographically ordered list of all possible output tokens.

2. The process of claim 1, in which the step of anonymising the original data incurs information loss, and the further step of including the digital watermark does not add significant further information loss.

3. The process of claim 1, in which the digital watermark operates on a probabilistic basis.

4. The process of claim 1, in which the watermark is included in original raw data that has been anonymised, as opposed to metadata or redundant data, and the original raw data is data such as a tabular file, a relational or a non-relational database, or the results of interactive database queries.

5. The process of claim 1, in which anonymising the data is achieved using one or more techniques that perturb the original data, such as tokenization, and/or generalization and/or data blurring and/or insertion of synthetic records; and/or reordering records or data fields within the dataset.

6. The process of claim 5, in which the technique that perturbs the original data is tokenization, and the watermarking is incorporated by extending this tokenisation to generate or select replacement values according to a key or containing a hidden pattern; a function of other fields in the same record; or to use some unique token values in each data release which only ever appear in that release and so uniquely identify it.

7. The process of claim 5 in which the technique that perturbs the original data is generalization, and the watermarking is incorporated through the choice of how to generate the replacement for a raw value; or the distribution of the populations of the unique groups; or the choices of group boundaries; or selecting group members to create patterns of data in other variables in the dataset for those individuals within a group.

8. The process of claim 5, in which the technique that perturbs the original data is data blurring, and the watermarking is incorporated by perturbing the data in such a way as to include a pattern within the perturbed values, or to generate the offset values according to an algorithm or secret key.

9. The process of claim 5, in which the technique that perturbs the original data is insertion of synthetic records, and watermarking is incorporated by generating the data in these synthetic records according to a pattern or digital key.

10. The process of claim 5, in which the technique that perturbs the original data is the removal of records, and watermarking is incorporated by the choice and recording of which records to include and suppress.

11. The process of claim 5, in which the technique that perturbs the original data is reordering records or data fields within the dataset.

12. The process of claim 1, in which the watermark to be encoded into the anonymised data is a number or other ID (collectively a 'number') which is stored in a watermark registry or is a number that is related or mapped to another number which is stored in the watermark registry, and in which the number stored in the watermark registry is: a random number; a random decimal number; a non-random number; an e-mail address; a unique ID associated with a person; a unique text string; or any data string mapped or related to the foregoing.

13. The process of claim 12, in which the length of the number is determined by the number and size of the file's available watermark carrier, in which a watermark carrier is the application of one or more of the following perturbation techniques: tokenization; generalization;
    data blurring; insertion of synthetic records; reordering records or data fields within the dataset.

14. The process of claim 12, in which each watermark carrier uses its assigned digits as the probability of performing some mutation to each value it processes.

15. The process of claim 12, in which reprocessing of the resultant output file and observing how often the mutation occurs allows deduction of the probability with which it was applied, and hence enables reconstruction of the watermark.

16. The process of claim 12, in which an audit trail of who authorized data access to which user, and for what purpose is encoded within the watermark or stored in the registry, with the key to that record encoded within the watermark.

17. The process of claim 1, in which, for each watermarked data release, the registry also stores details including one or more of: the source data location, schema and description, the policy and techniques applied to create the anonymised copy, the level of sensitivity of the source and anonymised data, the name and contact details user or group of users approved to use the anonymised data, the name and contact details of the approver, and the purpose and duration for which the data is to be used.

18. The process of claim 1, in which the watermark is encoded at the row level of a file, so that the removal or modification or addition of individual rows in the output has negligible effect on the ability to reconstruct the watermark.

19. The process of claim 1, in which mutations are applied to each cell or row of a file individually, without any knowledge of what mutations will be applied to other rows, to allow the watermark to be applied to the data in a distributed, streaming fashion.

20. The process of claim 1, in which the watermark is encoded by altering the frequency distribution of bits or digits in the anonymised data.

21. The process of claim 1, in which N is chosen depending on the range of the numeric values to constrain value distortion to an acceptable range.

22. The process of claim 1, in which the watermark component is an N digit decimal number D with a first digit that is >0, which is used to exclude any output tokens that have an ordinal that is divisible by D, and to reconstruct the watermark digits, the process is to create a histogram with a bin for each number from $10^{N-1}$ to $10^N-1$ and for each token the process is to increment the bin count for all of the token ordinal's factors, so that the lowest ordinal bin with a zero count or small count reveals the watermark digits.

23. The process of claim 1, in which N is set with regard to the number of unique input values that require tokenisation, so that a greater volume of data requires a larger value of N.

24. The process of claim 1, in which there is no requirement to exactly reconstitute the watermark but merely to be able to perform a fuzzy match of a calculated value to the distinct possibilities recorded in a watermark registry that stores watermarks.

25. The process of claim 1, in which at least some of original data defines private medical or health data; or private banking or financial data; or private communications data; or human resources or payroll data; or retail or e-commerce data; government records, including records relating to one or more of: taxation; health insurance; mortgages; pensions; benefits; education; health.

26. A computing apparatus adapted to alter original data in a dataset, the apparatus comprising a processor that is configured to:
(a) anonymise the original data by using a non-hashing algorithm, in which the original raw data comprises text strings;
(b) include a digital watermark in the anonymized data to generate a watermarked data release, the digital watermark being taken from a source that is extrinsic to the dataset, and in which the digital watermark comprises a text string and is embedded in the anonymized data text strings, and not in any metadata or redundant data; and
(c) provide the watermarked data release;
and in which the digital watermark associates the watermarked data release dataset with an audit trail of which user or users are authorised to use that watermarked data release;
in which watermark carriers are at the cell level and depend on whether the cell data type is for numeric values or tokenised values;
in which, where the cell data type is for numeric values, N*M digits of the watermark are used to mutate the N least significant bits of each value, with a precision of M, and for each of the N watermark digits, the digit is divided by $10^M$ to derive the probability that this bit will be set in one of the values, and values in the cell are then mutated, setting this bit with the required probability; and when reading the file back, the process is to stream through the values and derive the probability of zero for each of the N carrier bits, to a precision of M, to reveal the N*M original digits;
and in which, where the cell data type is for tokenised values, tokenised cell values are generated consistent with some regular expression and analysis of this regular expression gives a lexicographically ordered list of all possible output tokens.

27. The process of claim 1, in which M is chosen based on the data volume.

28. A computer-implemented process of altering original data in a dataset, comprising the steps of:
(a) anonymising the original data, in which anonymising the original data is achieved using a non-hashing algorithm, and in which the original raw data comprises text strings;
(b) including a digital watermark in the anonymised data to generate a watermarked data release, the digital watermark being taken from a source that is extrinsic to the dataset, and in which the digital watermark comprises a text string and is embedded in the anonymised data text strings and not in any metadata or redundant data; and
(c) providing the watermarked data release;
and in which the digital watermark associates the watermarked data release with an audit trail of which user or users are authorised to use that watermarked data release;
in which anonymising the data is achieved using one or more techniques that perturb the original data, including the insertion of synthetic records and/or reordering records or data fields within the dataset;
in which where the technique that perturbs the original data is the removal of records, and watermarking is incorporated by the choice and recording of which records to include and suppress, then the watermark digits define a band of the hash number space and if the watermark component is an N digit decimal number D with a first digit that is >0, then this range is given by [HL+((HU−HL)*(D−1)*10−N), HL+((HU−HL)*D*10−N)), where HL and HU are the lower and upper bounds of the hash number space; and in which the digits can then be reconstructed from the output file by hashing each row and building up a histogram of hash frequency, where each bin has width 10−N of the hash number space so that the bin that contains no values reveals the digits for this watermark carrier;

in which, where the technique that perturbs the original data is the addition of records, then N watermark digits define a slice of the hash space and synthetic data is then generated that hashes to a number within this range and in which the digits can be reconstructed from the output file by hashing each row and building up a histogram of hash frequency so that a bin that is overrepresented in this histogram reveals the digits for this watermark carrier.

* * * * *